United States Patent
Zemanek et al.

[11] 3,885,133
[45] May 20, 1975

[54] METHOD AND APPARATUS FOR CALCULATING EXPONENT CHARACTERISTICS

[76] Inventors: Rudolph Zemanek; Elena Zemanek, both of 516 S. Orlando Way, Vancouver, Wash. 98664

[22] Filed: Feb. 7, 1974

[21] Appl. No.: 440,298

[52] U.S. Cl. ............................ 235/64.3; 235/78 A
[51] Int. Cl. ............................................ G06c 19/02
[58] Field of Search .... 235/64.3, 78 R, 78 A, 78 M, 235/88 R, 88 M; 35/31 A

[56] References Cited
UNITED STATES PATENTS

| | | | |
|---|---|---|---|
| 106,701 | 8/1870 | Leilich | 235/78 A |
| 594,734 | 11/1897 | Giguere | 235/78 A |
| 808,045 | 12/1905 | Haas | 235/88 M |
| 838,696 | 12/1906 | Doherty | 235/64.3 |
| 1,406,712 | 2/1922 | Wolpert | 235/88 M |
| 2,237,873 | 4/1941 | Barok | 235/78 A |

*Primary Examiner*—Lawrence R. Franklin
*Attorney, Agent, or Firm*—John W. Adams

[57] ABSTRACT

This apparatus is an exponent calculator for slide rules which includes first, second and third scale elements, the first of which is stationary and the second and third being movable with respect to said first scale, the first and second scales being similarly divided and numbered and the third being attached to the second for movement therewith and including reference indicia registrable with the numbers on the first scale to indicate the proper increment of movement of the second scale for each exponent being calculated. The specific form of the invention illustrated embodies a stationary disc carrying the first scale and a rotary disc concentrically mounted in underlying relation to the first disc and carrying the second and third scales whereby each exponent number being calculated is identified on the first scale and the specific reference indicium on the third scale in registration with said number indicates the proper increment of movement of the second scale to calculate the resultant exponent characteristic.

This method consists in the following steps:
1. providing a calculator with three scale elements.
2. successively aligning each exponent number on scale one with the reference indicium on scale three.
3. moving scales two and three to bring said reference indicium on scale three into registration with a fixed reference point thereby automatically aligning the resultant exponent number of scale two with said fixed reference point.

2 Claims, 3 Drawing Figures

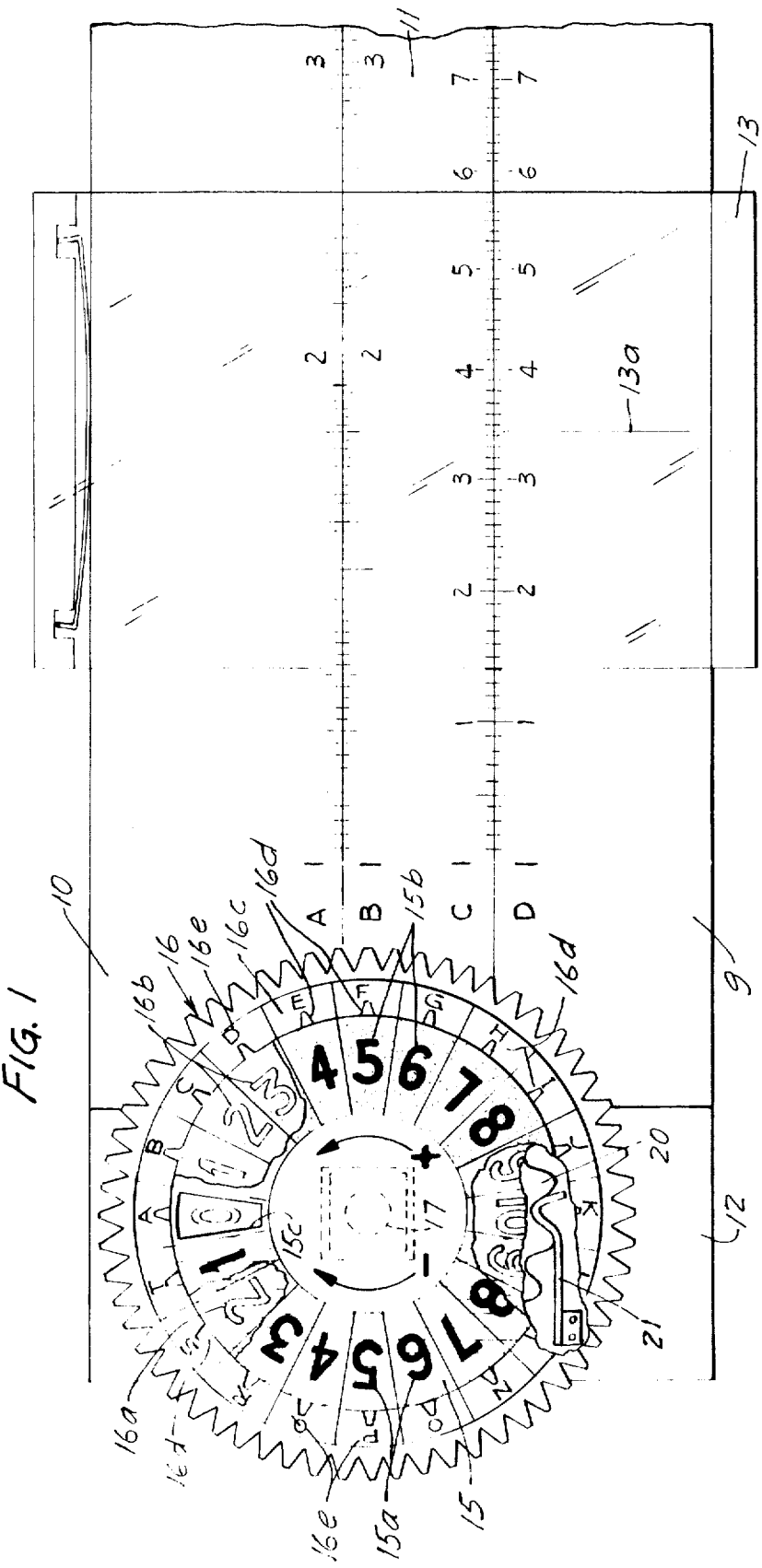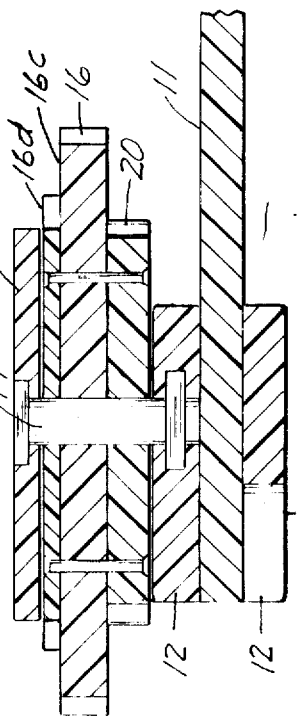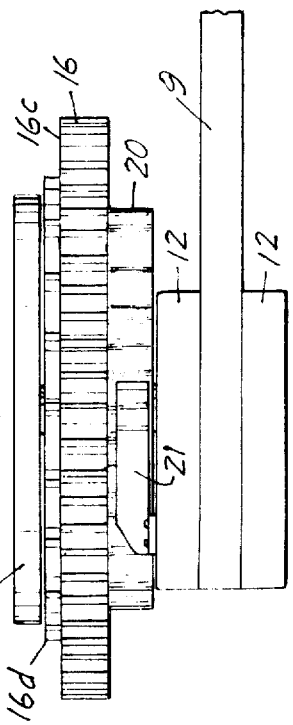

3,885,133

METHOD AND APPARATUS FOR CALCULATING EXPONENT CHARACTERISTICS

A number of different exponent calculators have been developed in the past such as those disclosed in U.S. Pat. No. 838,696 to Doherty and No. 2,490,240 to Smidl. However none of these includes the three scale arrangement embodied in the present invention by which the precise increment of relative movement between the first two scales will be automatically indicated by the third scale.

It is an object of the present invention to provide an exponent characteristic calculator for slide rules by which the increment of movement of the two calculator scales will be automatically indicated on a third scale by registration with the exponent number to be added to (or subtracted from) the exponent number previously recorded on the calculator.

More specifically, it is an object to provide a pair of superimposed scales, one movable with respect to the other and the increment of movement being precisely indicated by the registered position on a third scale of the exponent number registered therewith.

Still more specifically it is an object to provide a pair of concentrically mounted discs one of which is rotatably mounted with respect to the other and each having a pair of numbered scales, the rotable disc also having a reference scale arranged concentrically outwardly of the numbered scale thereon and registrable with the scale of the stationary disc to automatically indicate the increment of rotation of the rotatable disc in accordance with the exponent being added or subtracted in the calculation.

It is another object to provide a method for calculating the resultant exponent characteristic of numbers being computed on a slide rule by carrying out the following steps:

1. providing a calculator with three scale elements.
2. successively aligning each exponent number of scale one with the reference indicium on scale three.
3. moving scales two and three to bring said reference indicium on scale three into registration with a fixed reference point thereby automatically aligning the resultant exponent number of scale two with said fixed reference point.

These and other objects and advantages will more fully appear from the following description made in connection with the accompanying drawing wherein like reference characters refer to the same or similar parts throughout the several views, and in which:

FIG. 1 is on top plan view of one end portion of a conventional slide rule on which the exponent characteristic calculator is mounted;

FIG. 2 is a side elevational view thereof; and,

FIG. 3 is a central, vertical, sectional view thereof.

The calculator embodying the present invention is disclosed herein as being attached to a conventional slide rule; however this calculator is well adapted for use with the slide rule disclosed and claimed in pending U.S. Pat. application Ser. No. 350,314 filed Apr. 12, 1973, also invented by the inventors of the present invention.

The conventional slide rule illustrated herein has a pair of stationary members 9 and 10 with a slide 11 slidably mounted therebetween. The stationary members 9 and 10 are rigidly fixed together at their ends by suitable attachment bars 12 on each side thereof. Similar attachment bars (not shown) rigidly connect the other ends of the stationary members 10 and 11. A cursor member 13 having a cross hair 13a, is slidably mounted on the stationary members 10 and 11 in the conventional manner for aligning the numbers during slide rule computation. For purposes of illustration the slide rule members 9, 10 and 11 have conventional multiplying and dividing A, B, C and D scales although our exponent calculator is adapted for use with any slide rule computation.

The form of the calculator illustrated herein embodies a pair of disc members 15 and 16. The discs are concentrically mounted on a fixed central hub 17 to which the upper disc 15 is secured in stationary position and the disc 16 is rotatably mounted thereon. The hub member 17 is fixed to the upper cross bar 12 and extends upwardly therefrom as best shown in FIG. 3. A positioning cog wheel 20 is provided in fixed relation to the bottom side of rotating disc 16 as best shown in FIG. 2. A spring stop member 21 has one end fixed to the top of the upper cross bar 12 as best shown in FIG. 2 as its other end is spring pressed into the respective recesses between the cogs of said cog wheel 20 to maintain the desired adjusted position of the rotating disc 16, as best shown in FIG. 1.

Each of the discs 15 and 16 has similarly divided and numbered scales each divided into two sections respectively designated by the numerals 15a and 15b and 16a and 16b. The disc 15 has a window 15c formed in the upper center portion thereof which forms a fixed reference point for the numerals on the scales 16a and 16b. The two scale sections 15a and 15b are, in the form shown, consecutively numbered from 1 through 10 around opposite semi-circular portions of said disc, with the numeral 10 being common to both scales at the bottom of the disc. The scale sections 16a and 16b of the disc 16 underlie the respective sections 15a and 15b of the disc 15 with a "zero" positioned between the two numbers "one" of said sections 16a and 16b. In the form shown all four scale sections 15a and b and 16a and b have the same radius so that the stationary sections 15a and b are superimposed over the rotating scales 16a and b and as previously stated, the respective numbers of the sections 16a and b appear in the window 15c of disc 15 as a fixed reference point for said scale sections 16a and 16b. The scale sections 15a and 16a are identified as "minus" scales and are appropriately color coded, such as by having a red color background. The scale sections 15b and 16b are identified as "plus" scale sections and are appropriately color coded as by having a black background. The zero disposed between the scale sections 16a and 16b on disc 16 represents the starting point of each computation and the numbers on sections 15a and 15b are in respective overlying registration with numbers on the sections 16a and 16b when said zero on disc 16 appears in the window 15c of the disc 15.

The rotary disc 16 is larger than the stationary disc 15 thus providing an outer peripheral portion 16c of the disc 16 that is exposed around the outside of the stationary disc 15. This portion 16c has reference scale with letter indicia 16e. The divisions identified by the letter indicia 16e are respective radial extensions of the numbered divisions of scale sections 16a and 16b. The top portion of disc 16 has a plurality of spaced pointer elements 16d which are centrally disposed with respect to the circumferentially arranged divisions identified by the letters 16e. These pointers 16d permit quick reference between the numbered divisions of scale sections 15a and 15b of disc 15 and the letter indicia 16e on outer portion 16c of disc 16. For example: when a number with an exponent of plus 2 is being multiplied on the slide rule, the operator will find the numeral 2 on the black (plus) scale section 15b and the pointer 16d in registration with said numeral 2 will indicate the corresponding letter 16e also in registration with said pointer. This letter indicium will then be rotated into registration with the stationary reference point formed by window 15c of stationary disc 15 and the number appearing in said window will indicate the appropriate exponent characteristic on scale section 16a or 16b. The following is a specific example of how our calculator would be operated to provide the exponent characteristic of the following three numbers (120, 0.004, and 12.5) when said numbers are multiplied on a slide rule:

The scales are initially adjusted so that the zero on the rotary disc 16 appears in the window 15c. The exponent of the number 120 ($1.20 \times 10^2$) is plus 2 so that the number 2 is located on the black scale section 15b which is in registration with the identifying letter C division on the outer portion 16c of disc 16. The rotary disc 16 is then rotated to bring the letter C into registration with the window 15c between the scales 15a and 15b and the number 2 of the scale section 16b will appear in said window 15C.

The exponent of the next number, 0.004 ($4 \times 10^{-3}$), is minus 3 (−3) so the number 3 is located on the red scale section 15a. The corresponding identifying letter indicium 16e opposite the 3 on the red scale 15a will be T. The disc 16 is then rotated until the letter T is opposite the window 15c and the red number 1 on scale section 16a will then appear in the window which indicates a minus 1 (−1) exponent at this point in the calculation.

The next number, 12.5 ($1.25 \times 10^1$), has an exponent of plus 1 and the number 1 is then located on the scale section 15b and the corresponding identifying letter indicium 16e on disc portion 16c will be A, which will then be rotated into registration with the window 15c, and the computed exponent characteristic zero (0) will then appear in said window. This represents the exponent of the number 6 computed on the slide rule when the above three numbers are multiplied.

It will be seen that we have provided a method and apparatus for effectively calculating the exponent characteristic of the resultant answer in a slide rule computation. By providing the reference scale, the increment of movement of the rotary disc can be quickly and easily determined thus simplifying the calculation process and greatly reducing the chance for error, especially by novice operators.

It will of course be understood that various changes may be made in form, details, arrangement and proportions of the parts without departing from the scope of this invention, which generally started, is set forth in the accompanying claims.

What is claimed is:

1. An exponent characteristic calculator for use with slide rule computations, said calculator comprisng,
    a. a first stationary disc having numbered scale divisions thereon and a window therein forming a fixed reference point,
    b. a second disc mounted for rotation about its center point as an axis in underlying concentric relation to the first stationary disc and carrying a second scale having similar numbered divisions to said first scale positioned for selective registration of the scale numbers with the window of said first overlying disc,
    said second disc having outer peripheral portion surrounding said first disc and of larger diameter than the first disc and having a third scale including reference indicia carried by said outer peripheral disc portion with the indicia thereof respectively registered with the numbers on said second scale and selectively registrable with the numbers on the first scale,
    whereby the increment of rotation of the second disc will be indicated by the specific scale indicium on said third scale in registration with each specific exponent number identified on the first scale and the calculated exponent number will thus be indicated by the number on the second scale in registration with the window in the first disc.

2. The structure set forth in claim 1 and a plurality of peripherally spaced pointers mounted on said rotary disc in respective registration with the divisions and reference indicia on said reference scale to facilitate determination of the proper reference indicium in registration with each exponent number on the first scale.

* * * * *